United States Patent
Xu et al.

(10) Patent No.: US 7,546,604 B2
(45) Date of Patent: Jun. 9, 2009

(54) PROGRAM REACTIVATION USING TRIGGERING

(75) Inventors: Weixin Xu, Sunnyvale, CA (US);
Pratima Ahuja, Foster City, CA (US);
Adwait B. Sathye, Sunnyvale, CA (US);
Chengdong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/721,367

(22) Filed: Nov. 26, 2003

(65) Prior Publication Data

US 2005/0114867 A1    May 26, 2005

(51) Int. Cl.
G06F 3/00     (2006.01)
G06F 15/177   (2006.01)
G06F 9/00     (2006.01)
(52) U.S. Cl. .............................. 719/313; 709/220; 713/1
(58) Field of Classification Search ................. 719/318, 719/313; 713/1; 709/220
See application file for complete search history.

(56) References Cited

U.S. PATENT DOCUMENTS

| | | | |
|---|---|---|---|
| 6,031,991 A | 2/2000 | Hirayama | |
| 6,591,379 B1 | 7/2003 | LeVine | |
| 6,654,801 B2 * | 11/2003 | Mann et al. | 709/224 |
| 6,718,376 B1 * | 4/2004 | Chu et al. | 709/223 |
| 7,140,025 B1 * | 11/2006 | Dillow et al. | 719/313 |
| 2002/0007410 A1 | 1/2002 | Seagren | |
| 2002/0064126 A1 * | 5/2002 | Bhattal et al. | 370/217 |
| 2002/0073409 A1 | 6/2002 | Lundback | |
| 2003/0114163 A1 * | 6/2003 | Bickle et al. | 455/450 |

FOREIGN PATENT DOCUMENTS

| | | | |
|---|---|---|---|
| JP | 58195345 A | 11/1983 |
| JP | 58195345 A | 11/1983 |
| JP | 2224053 A | 9/1990 |
| JP | 2224053 A | 9/1990 |
| JP | 5165539 A | 7/1993 |
| JP | 5165539 A | 7/1993 |
| JP | 2001022709 A | 1/2001 |
| JP | 2002111674 A | 4/2002 |
| JP | 2003131896 A | 5/2003 |
| WO | WO0193038 A2 | 12/2001 |
| WO | WO0193038 A2 | 12/2001 |
| WO | WO0193038 A3 | 12/2001 |

(Continued)

OTHER PUBLICATIONS

Java Management Extensions Instrumentation and Agent Specification, v1.2, Sun Microsystems, Inc., Oct. 2002, Chapters 1 and 5.

(Continued)

*Primary Examiner*—Lechi Truong
(74) *Attorney, Agent, or Firm*—Michael J. Buchenhorner; Prentiss W. Johnson

(57) ABSTRACT

The present invention provides a method for remotely activating application programs and adapters including a queue manager (QM) that monitors for predetermined trigger events (e.g., time out for messages in an application queue) and, when such events occur, generates a trigger message. The trigger message includes process information associated with the application which is used by a trigger monitor application to issue an appropriate command to the application.

4 Claims, 5 Drawing Sheets

FOREIGN PATENT DOCUMENTS

| | | |
|---|---|---|
| WO | WO0193038 A3 | 12/2001 |
| WO | WO0248886 A2 | 6/2002 |
| WO | WO0248886 A2 | 6/2002 |

OTHER PUBLICATIONS

VisiBroker for C++ 4.5: Programmer's Guide: (downloaded from info.borland.com/techpubs/boks/vbcpp, date unknown) (Chapters 20 and 30).

VisiBroker for C++ 4.5: Programmer's Guide: (downloaded from info.borland.com/techpubs/boks/vbcpp, date unknown) (Chapters 20 and 30), 2001.

\* cited by examiner

PROGRAM REACTIVATION USING TRIGGERING

TECHNICAL FIELD

The invention disclosed generally relates to computers and computer software. More specifically, the invention is generally related to program activation tools.

BACKGROUND OF THE INVENTION

One of the major challenges in computer operations is how to maintain high availability of applications to user entities. As more mission critical services become remotely accessible, and as more businesses become intertwined in mesh-like networks, the need for better ways to insure high availability has grown more pressing.

Past solutions for maintaining high availability have predominantly focused on increasing hardware and software reliability. However, once a program stopped working or crashed, the common solution offered was a local reboot of the affected platform. When the affected platform is remote yet can only be manually restarted, availability is lost for hours at a time. Even systems where there is a local administrator can be down long enough to impact operations, particularly if the administrator is not immediately notified or available to tend to the outage.

Another factor affecting the ability to deliver high availability is the serviceability of a system's components. Many software applications need constant upgrades or patches. Frequently, the application programs must be restarted after the changes have been made in order for program to work in its modified state. If the application is on a remote platform, the inability to automatically restart an application may mean that necessary changes have to be deferred until qualified technicians can visit the remote site. But even with local systems, downtime may be adversely affected if technicians are not able to stand by and monitor for when an upgrade or patch is done and the application ready for restart.

One solution to these problems for systems needing high availability is the use of duplicate or mirrored platforms, sometimes running constantly in a "hot-swappable" configuration. While this does address many of the problems noted above, the implementation can be complex and cost prohibitive. Thus, this is not a viable option for most systems.

Another approach that has been used to provide a limited remote start functionality can be found in Borland's VisiBroker® object start/deferred start capability. This feature operates in a CORBA Object Request Broker (ORB) runtime environment via an object activation daemon (OAD). The OAD is an implementation of the CORBA Implementation Repository, providing a runtime repository of information about the classes a server supports, the objects that are instantiated, and their IDs, and may be used to automatically activate an implementation when a client references an object registered with the OAD. This latter feature reduces overhead by allowing servers that implement objects for client applications to be started on demand, rather than running continuously. However, because of its ORB architecture, this activation functionality will not work across the internet. Each object implementation must also be a child process of the OAD process, with all environment variables passed into the OAD.

JMX, or Java Management Extensions, offers yet another approach to remotely activating components. JMX operates by instantiating a management agent within a JVM (Java virtual machine), this agent having a MBean server instance, an adapter and a set of services. The agent can effectively change the state of a component (e.g., to start or stop it) by controlling the MBean server to pass messages based on start or stop requests. However, this is a Java-specific implementation, and a key weakness is its reliance on the agent running within a JVM environment. If the JMX agent or JVM is down, there is no way to restart the adapter (agent) or dependent services.

Thus, while these two programs have been designed with the ability to remotely start or stop other registered objects, these are limited to control of child processes (activated via an ORB OAD), or to control of clients via an agent server instance, and these fail to provide or suggest automated approaches for restarting agents or remote applications that have lost connectivity. Other solutions, like manual intervention or hot-swappable mirror sites are too complex, expensive, and/or time consuming to be widely adopted. Thus, there remains a need for a better way to increase availability and serviceability of networked applications.

SUMMARY

The present invention provides a method for activating application programs and adapters. In one embodiment, a reactivation program is provided for monitoring messaging between the application program and a further application for a predetermined event; generating a trigger message based on the predetermined event and predetermined process parameters associated with the application program; and generate an activation command based on the trigger message operable for activating the application program. In a further embodiment, the queue manager (QM) operates to monitor for predetermined trigger events (e.g., time out for messages in an application queue) and, when such events occur, to generates a trigger message including process information associated with the crashed application that is being monitored, which is used by a trigger monitor application to issue an appropriate command to the application. A heartbeat monitor can be used to determine when connectivity is lost (i.e., indicative of a crash). The trigger message may be placed in an initiation queue, read out by a trigger monitor, and a restart command message, according to the process parameters, sent to the application. The process definition can also be used by more than one initiation queue.

BRIEF DESCRIPTION OF THE DRAWINGS

While the invention is defined by the appended claims, as an aid to understanding it (together with certain of its objectives and advantages), the following detailed description and drawings are provided of an illustrative, presently preferred embodiment thereof, of which:

DESCRIPTION OF THE PREFERRED EMBODIMENT

In a preferred embodiment of the invention, a reactivation program is provided that includes a broker that operates to monitor for predetermined trigger events (e.g., when a heartbeat monitor determines a connection is lost or timed out) and, when such events occur, to generate an application message. This application message, indicative of the crash or other trigger event, causes a trigger event to be read by the queue manager (QM). The QM then generates a trigger message that includes process information associated with the crashed application which is used by a trigger monitor application to issue an appropriate command to the application. In a preferred embodiment, the trigger message is placed in an initiation queue, read out by a trigger monitor, and a restart command message or invocation, according to the process parameters, sent to the application. One initiation queue can be used to handle multiple process definitions. This reactivation program is advantageously used in systems like those using an integration broker to facilitate communications between different applications.

This embodiment may be advantageously implemented as part of complex systems like business integration (BI) systems. One example of a BI system is WebSphere (MQ series) Business Integration Servers and programs, available from International Business Machines (IBM). A convenient way to implement this preferred embodiment is to use an integration broker to coordinate data exchange, a set of adapters to allow heterogeneous business applications to exchange data, and business objects used to coordinate transfer of the data. The adapter includes a connector that links the applications to the integration broker.

The reactivation feature of the embodiment described here enables an integration broker to programmatically monitor the components (e.g., adapters) that are part of an Enterprise Application Integration (EAI) solution. Through this feature, the integration broker can restart the component (adapter) if it detects that the component (adapter) has lost connectivity with the broker. It can also control the reboot and shutdown of the component running as a remote process. This beneficially provides control, monitoring capability and serviceability of a component.

Figure 1:
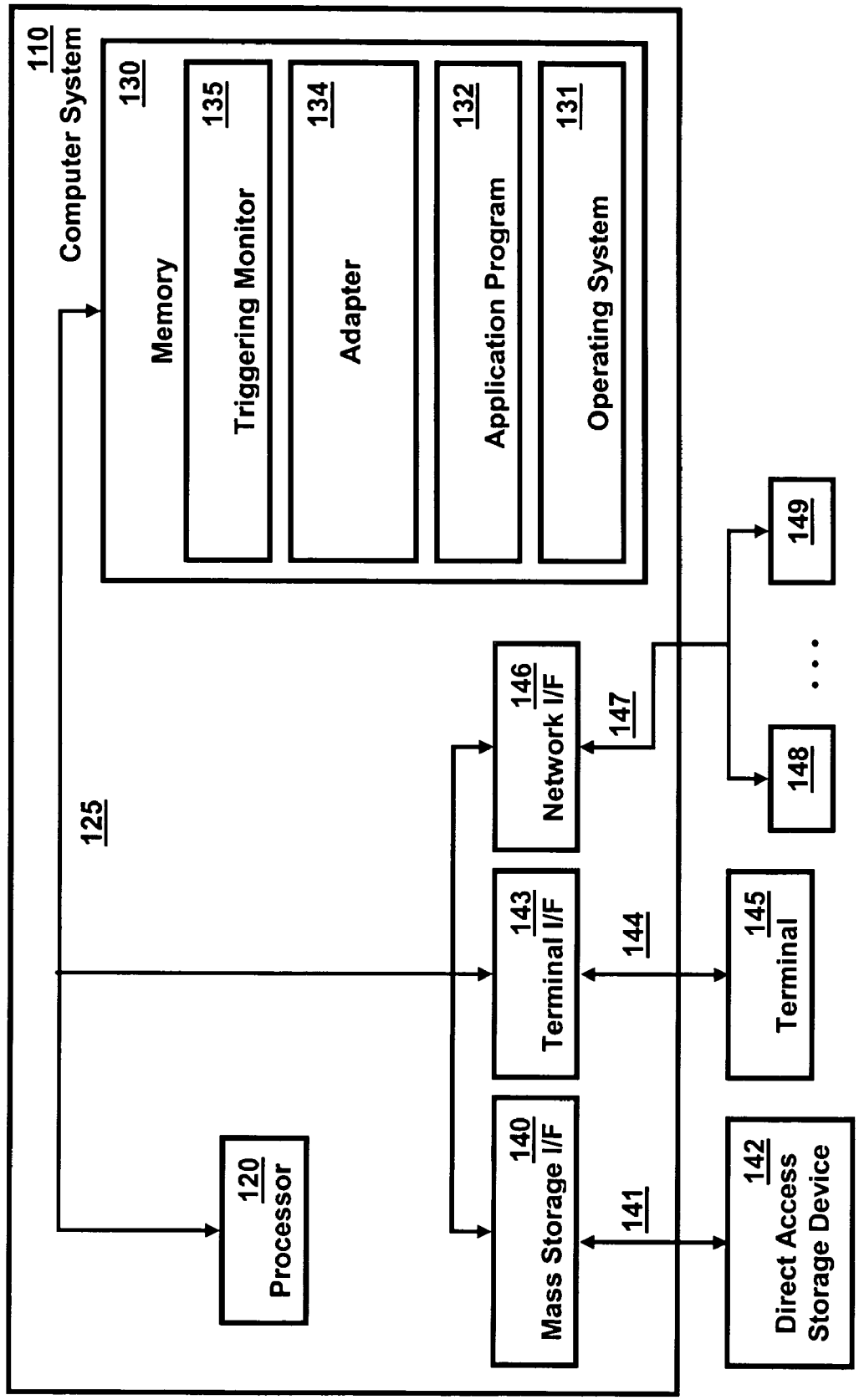
FIG. 1 is a block diagram of an information system consistent with the invention.

With reference now to the drawings and in particular FIG. 1, a pictorial representation of an information processing system in which the present invention may be implemented is depicted in accordance with certain presently preferred embodiments of the invention. In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

A particular information handling or processing system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described here may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Referring now to FIG. 1, a computer system 110 consistent with the invention is shown. For purposes of the invention, computer system 110 may represent any type of computer, information processing system or other programmable electronic device, including a client computer, a server computer, a portable computer, an embedded controller, a personal digital assistant, etc. The computer system 110 may be a standalone device or networked into a larger system. In one embodiment, the computer system 110 is an eServer iSeries OS/400 computer available from International Business Machines of Armonk, N.Y.

The computer system 110 could include a number of operators and peripheral systems as shown, for example, by a mass storage interface 140 operably connected to a direct access storage device 142 via high speed bus interface 141, by a video interface 143 operably connected to a display 145, and by a network interface 146 operably connected to a plurality of networked devices 148 . . . 149. The display 145 may be any video output device for outputting a user interface. The networked devices 148-149 could be desktop or PC-based computers, workstations, network terminals, or other networked information handling systems, connected by any one of a variety of networking systems including a local area network (LAN) 147, personal area network (PAN), or wide area network (WAN).

Computer system 110 is shown with a system environment that includes at least one processor 120, which obtains instructions or operation codes (also known as opcodes) and data via a bus 115 from a main memory 130. The processor 120 could be any processor adapted to support the debugging methods, apparatus and article of manufacture of the invention. In particular, the computer processor 120 is selected to support monitoring of memory accesses according to user-issued commands. Illustratively, the processor is a PowerPC available from International Business Machines of Armonk, N.Y.

The main memory 130 could be one or a combination of memory devices, including random access memory, nonvolatile or backup memory (e.g., programmable or flash memories, read-only memories, etc.). In addition, memory 130 may be considered to include memory physically located elsewhere in a computer system 110, for example, any storage capacity used as virtual memory or stored on a mass storage device or on another computer coupled to the computer system 110 via bus 115.

The main memory 130 includes an operating system 131, an application program 132 (e.g., a database), an adapter module 134, and a triggering monitor program 135. The triggering monitor 135 preferably includes a heartbeat routine that periodically checks the adapter or application to verify whether it is still running, but could include any convenient routine for verifying availability of the application or adapter. The adapter modules 134 are generally of the type of adapters or tools used to facilitate information exchanges between different programs, including those using different languages such as enterprise server applications using Oracle files, XML documents, etc. and web client applications using Java objects. These are generally implemented in software, separate or as a module of an application, but can be implemented in a combination of hardware (firmware) and software. In an alternate embodiment, the adapter tool could include features configured to interface with other programs or a user via a GUI (graphical user interface) at terminal 145. Although illustrated as integral programs, one or more of the foregoing may exist separately in the computer system 110, and may include additional components not described. Processor 120 implements the processes illustrated using computer implemented instructions, which may be located in a memory such as, for example, main memory 130, memory 142, or in one or more peripheral or remote devices 148-149 (including, e.g., an integration broker).

Figure 2:
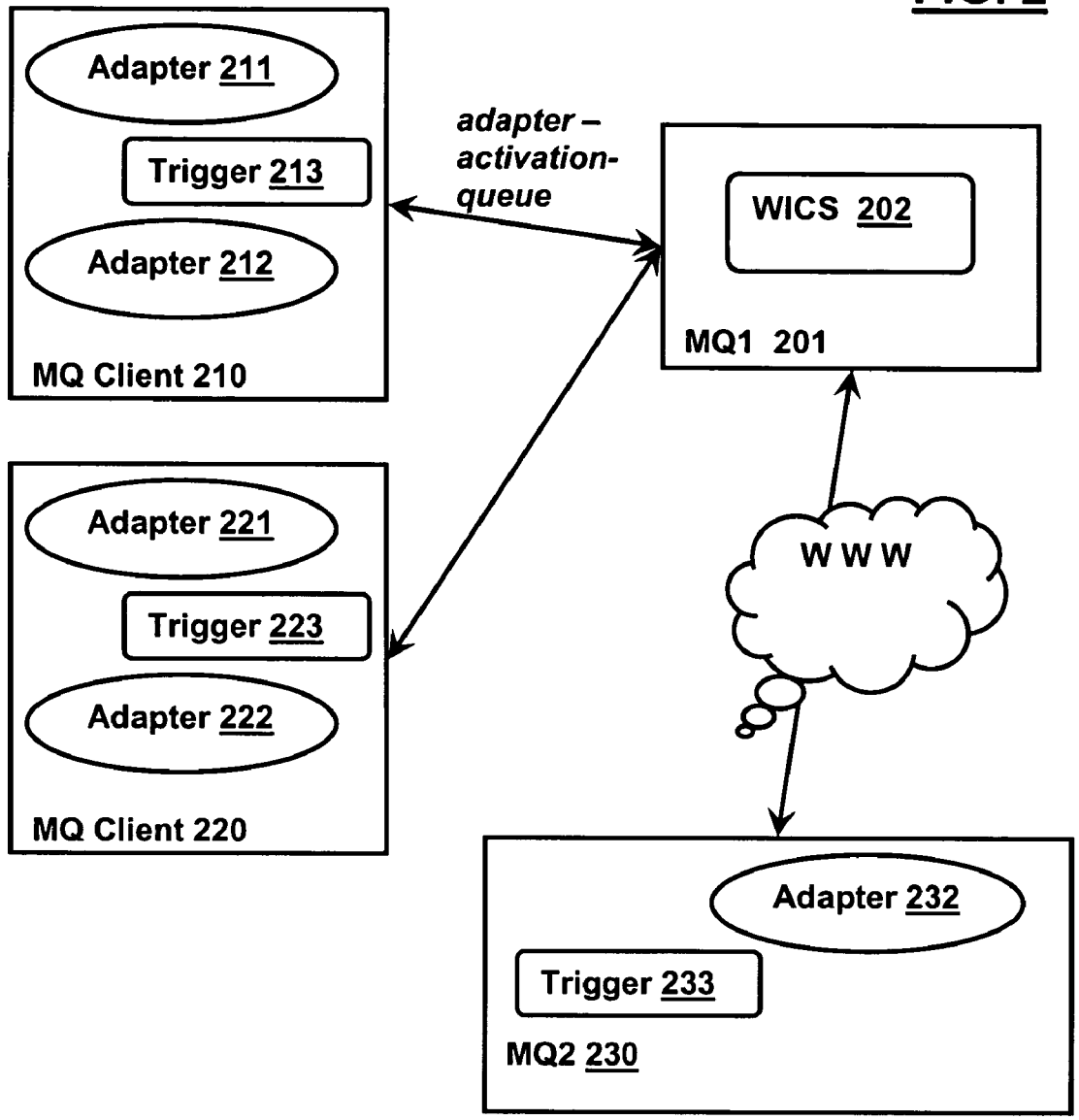
FIG. 2 is a block diagram illustrating an information system using remote adapters and trigger monitors in accordance with a first embodiment of the invention.

Turning now to FIG. 2, elements of a business integration system implementing the preferred embodiment are illustrated. These elements include an (MQ) integration server 201, which may be conveniently implemented by a WebSphere InterChange Server (WICS) 202. The integration server 201 facilitates communications with other platforms, including other business integration servers 230 and (MQ) client servers 210, 220. Adapters 211, 212, 221, 222 and 232 provide connectivity and framework services that facilitate communications each with one or more respective applications. Trigger Monitors 213, 223 and 232 read trigger messages and start applications, as discussed more fully below.

Figure 3:
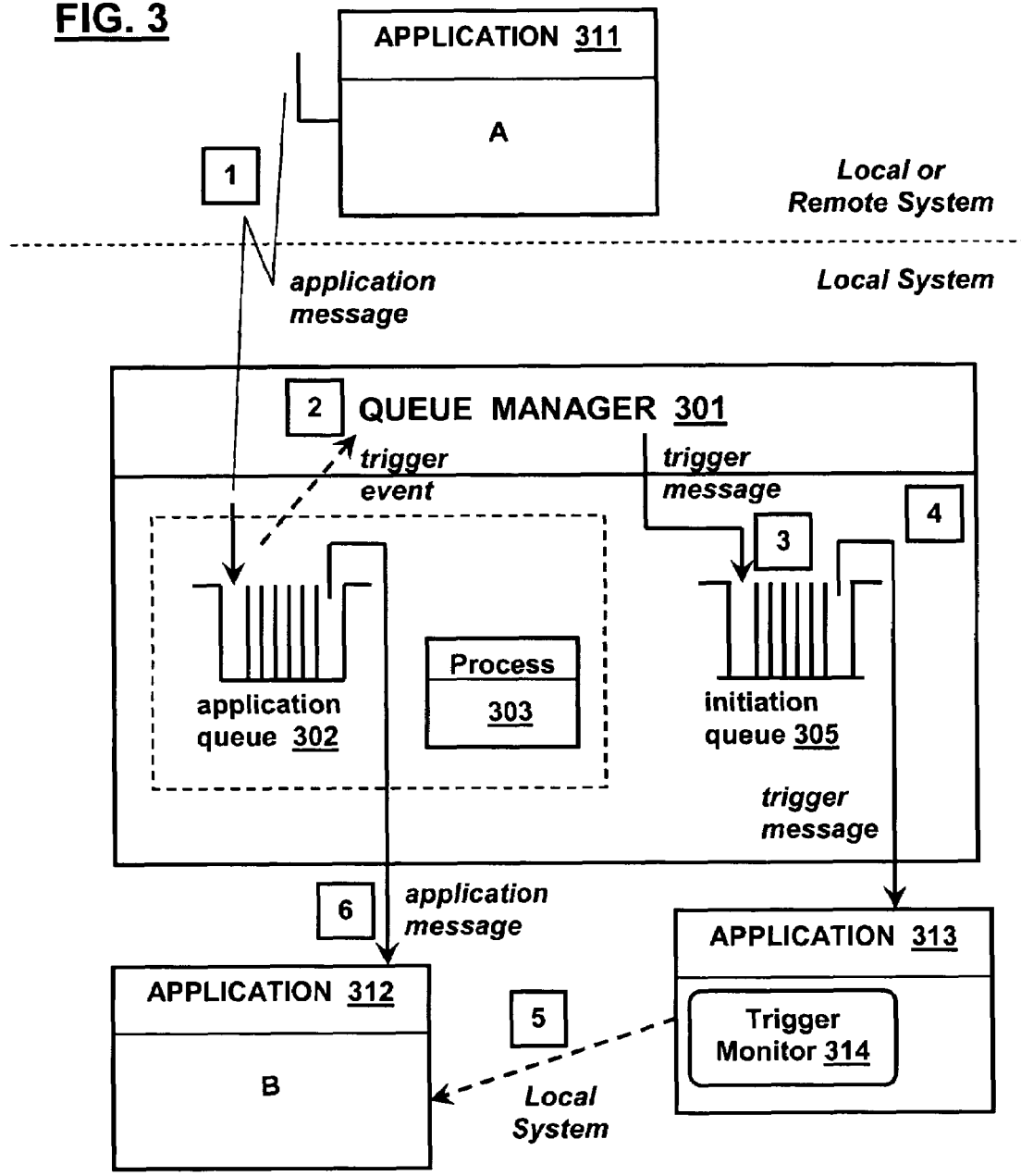
FIG. 3 is a block diagram illustrating the information system of FIG. 2 and an example of message flow when restarting an application.

FIG. 3 is a block diagram illustrating the preferred major elements for implementing such an integration system. In this case, normal application messaging is passed between applications 311 and 312. Application 312 includes a business integration adapter and an associated application. Application 311 may be, e.g., an integration broker (such as MQ server 201 of FIG. 2), and may be either local or remote to application 312. The local system for application 312 also includes a queue manager (QM) 301, and an application program 313 including trigger monitor 314. QM 301 manages various queues, including application queue 302, initiation queue 305, and queues defined for other operations (e.g., AdminInQueue and DeliveryQueue (not shown)).

Figure 4:
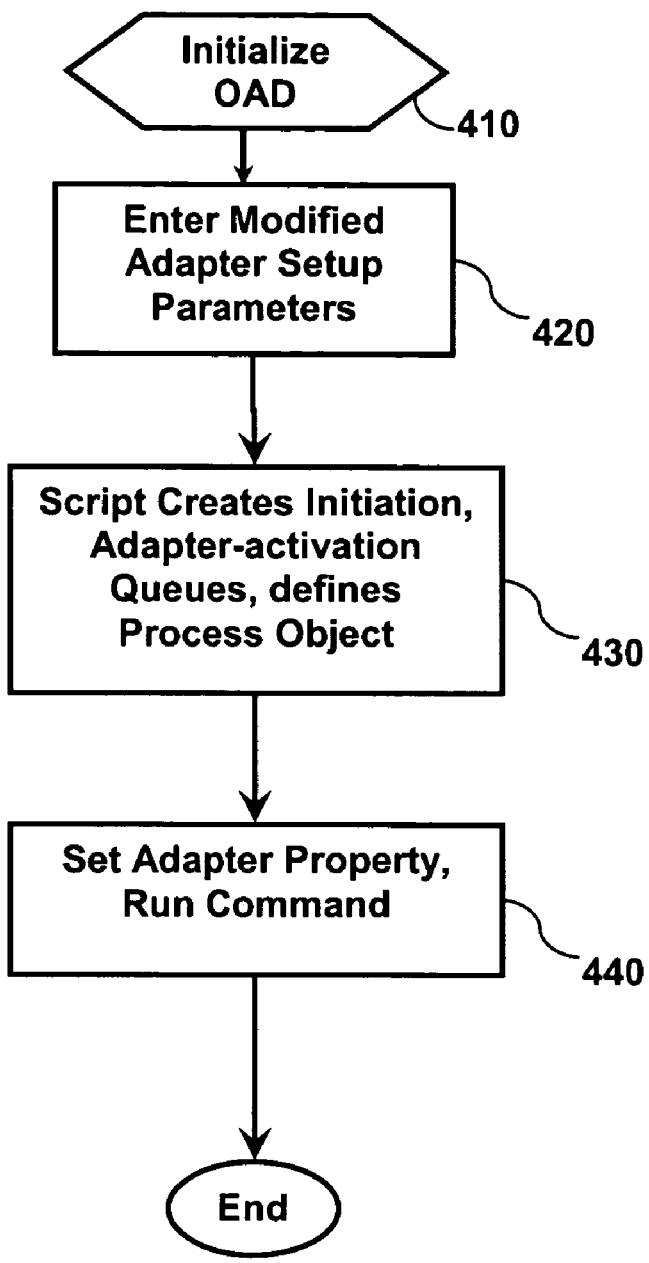
FIG. 4 is a flow chart of illustrative initialization steps for an activation program according to the first embodiment of the invention.
Figure 5:
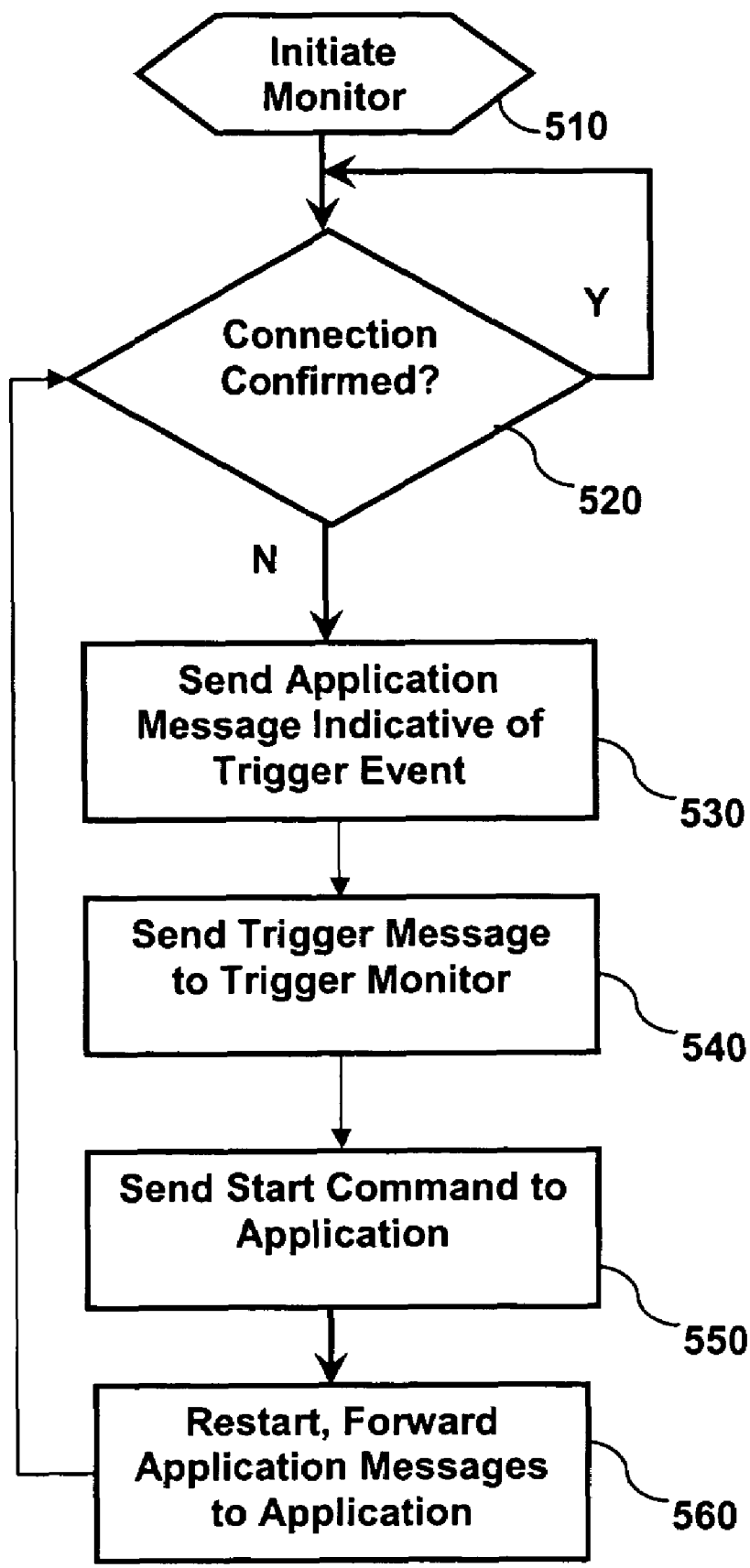
FIG. 5 is a flow chart of an illustrative application activation process according to the first embodiment of the invention.

The operation of the preferred embodiment may be understood by further reference to FIGS. 4 and 5, together with FIG. 3. The preferred integration system (e.g., WebSphere MQ) provides a facility, known as triggering, that enables an application 312 to be started automatically when there are messages available to retrieve. The QM 301 contains predefined conditions constituting trigger events in a process definition object 303. This object 303 may be readily implemented, as those skilled in the art will appreciate, by a trigger setup script program. In one such process, the script prompts the operator for four parameters: the QM name, the adapter name, the full path for the adapter start up batch file, and the server name. Additional operational parameters may also be selected, or default values used, which define the behavior of the event messaging from the integration server. These additional parameters may advantageously include the type of trigger event (e.g., no response for 1 minute), the action type (e.g., restart) and attributes (when to start, number of attempts, interval between attempts) (step 420). These features may be stored as part of the process definition, but in the presently preferred embodiment they are stored in the integration broker. Once entered, the script automatically creates an initiation queue 305, defines the process definition object 303, and creates an adapter-activation-queue and enables the triggering feature of this queue (steps 430, 510). In an MQ-triggered OAD, the adapter restart property would be set to true, and a run command entered to make sure the trigger monitor 314 is running (step 440). The restart property can be set to off or false initially and later set to true, and the trigger parameters can also be modified after initial set up.

Once initiated, the integration server can detect that a component (application 312) has crashed (e.g., using an application heartbeat (a periodic signaling indicative that the application is active) or other maintain connection mechanism). If a trigger event is detected, the integration broker generates an application message indicative of a triggering event (step 520, [1]). The QM 301 is then notified of the triggering event (step 530, [2]), which, if the conditions are met under which it is to generate a trigger message, causes the QM 301 to extract the process definition information and place it in a trigger message. The name of the process definition associated with a queue is preferably given by a ProcessName local-queue attribute.

The trigger event message is placed by QM 301 in initiation queue 305 (step [3]). The trigger monitor 314 (preferably a continuously running program) retrieves the trigger message from initiation queue 305 and reads it (step 540, [4]). Trigger monitor 314 in turn forwards a command (e.g., start, restart) to application 312 (step 550, [5]). In the preferred embodiment, a shut-down may also be controlled via a regular shutdown queue, with restart triggered via the initiation queue. In an alternative embodiment, shutdown can also be controlled via the initiation queue.

This process (steps [1]-[5]) are repeated according to the trigger parameters (e.g., number of times and interval) set for the application, controlled by the integration broker. The application 312 could be an end-use application (e.g., a database) or an application adapter. For example, if application 312 is an adapter, it may have lost connectivity when pulled down together with an associated application (e.g., enterprise application), for maintenance. If the down-time is unknown, a relatively high number of retries could be entered for a restart parameter. Thus, when the enterprise application is finally restarted, within a short period of time (i.e., at most the interval value set as a parameter) a repeat command message will be generated by trigger monitor 314, causing the adapter to restart. Once restarted, connection services are reestablished and the message(s) pending in application queue 302 may be forwarded to application 312.

This system advantageously allows for transparency across the web (i.e., remote applications in other systems, like broker 230 of FIG. 2, can trigger a restart) and ease of configuration. If an integration broker receives notification of a crash of a component, even if administered remotely, the broker can send a triggering message to the queue that has triggering enabled. As a result, the component will get restarted from broker, since it now has the information and connection needed for starting the component.

Thus, the embodiment described above provides an advantageous system using a triggering functionality to start a component in the event of its crash, or shutdown/restart a component in response to a broker request. These features generally allow for (a) detection when an adapter has lost connection with a broker, and (b) restart of the adapter when it is down. For detection, a "maintain connection" mechanism between the adapter agent and broker may be used to determine if the adapter is alive or not. For restart, an Object Activation mechanism may be used. More particularly, these features now enable the following:

1) Control—enabling an integration broker to have knowledge of the state of a component; if the component were to crash, the broker has the control to restart the component.

2) Monitor—enabling the integration broker to consistently monitor the state of the component, either remotely or locally.

3) Service—enabling the integration broker to provide the requisite type of service, depending on the state of the component that is being monitored and controlled.

4) Reliability/Availability—improving the overall reliability and availability of the broker and the components with which it is configured.

5) Serviceability—improving the overall serviceability such that a component can be controlled remotely by the broker or other monitor tool.

Of course, one skilled in the art will appreciate how a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The signal bearing media may take the form of coded formats that are decoded for actual use in a particular data processing system. Moreover, while the depicted embodiment includes an example in a Java environment, the processes of the present invention may be applied to other programming languages and environments.

In conclusion, the above description has been presented for purposes of illustration and description of an embodiment of the invention, but is not intended to be exhaustive or limited to the form disclosed. This embodiment was chosen and described in order to explain the principles of the invention, show its practical application, and to enable those of ordinary skill in the art to understand how to make and use the invention. Many modifications and variations will be apparent to those of ordinary skill in the art. Thus, it should be understood that the invention is not limited to the embodiments described above, but should be interpreted within the full spirit and scope of the appended claims.

What is claimed is:

1. A method as part of an enterprise application integration solution, the method comprising the following steps performed by a computer:

monitoring messaging between an integration broker and a remote application;

monitoring the messaging for at least one reason selected from a group of (a) an indication that a connection with an application adapter of the remote application is lost, and (b) a message indicative of an application adapter of the remote application entering a maintenance shutdown;

receiving a message indicative of a trigger event, said trigger event comprising process definition information about a state of the remote application;

retrieving the process definition information about the state of the remote application;

generating a trigger message based on the trigger event, said trigger message comprising the retrieved process definition information about the state of the remote application, wherein the trigger message enables the remote application to be started automatically when there are messages available to retrieve;

placing the trigger message in an initiation queue;

wherein the steps of receiving, retrieving, generating and placing are performed by a queue manager within the computer;

retrieving the trigger message from the initiation queue;

based on the trigger message, issuing a command to the remote application, wherein said command restarts the remote application if the trigger event is a loss of connectivity between the integration broker and the remote application;

storing operational parameters as part of the process definition information by storing a type of trigger event, an action to be taken, and action attributes comprising when to start, number of attempts, and interval between attempts;

wherein the steps of retrieving the trigger message and issuing are performed by a trigger monitor within the computer and wherein the trigger monitor comprises a heartbeat routine that periodically checks the remote application to verify whether it is still running; and storing application parameters which constitute trigger events comprising: an identifier of the queue manager, an identifier of the remote application, a full path for the remote application start up batch file, and a name of a server on which the remote application runs.

2. The method of claim 1 wherein the step of issuing the command comprises issuing a shut down command if the triggering event is a broker request to shut down.

3. The method of claim 1 wherein the step of issuing the command comprises issuing a restart command if the triggering event is a broker request to restart.

4. The method of claim 1 further comprising an initial step of:

generating the initiation queue.

* * * * *